(12) United States Patent
Sumino et al.

(10) Patent No.: US 6,422,368 B1
(45) Date of Patent: Jul. 23, 2002

(54) HYDRAULIC POWER TRANSMISSION JOINT

(75) Inventors: Hidemitsu Sumino; Tadahiko Kato; Akira Nakabayashi, all of Shizuoka; Toshiharu Takasaki, Kanagawa; Hirotaka Kusukawa, Machida; Shigeo Murata, Kanagawa, all of (JP)

(73) Assignees: Fujiunivance Co., Shizuoka; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/577,579

(22) Filed: May 25, 2000

(30) Foreign Application Priority Data

May 28, 1999 (JP) .......................... 11-149353

(51) Int. Cl.⁷ .............................................. F16D 31/00
(52) U.S. Cl. ........................ 192/59; 192/103 F; 464/27
(58) Field of Search .............................. 192/59, 103 F, 192/82 T, 54.3; 60/487; 91/485, 499; 464/27

(56) References Cited

U.S. PATENT DOCUMENTS 4,456,110 A * 6/1984 Hanks et al. .............. 192/82 T
5,037,353 A * 8/1991 Suzuki et al. .................. 464/27
5,103,642 A * 4/1992 Suzuki et al. ............. 192/59 X
5,706,658 A * 1/1998 Kato et al. ..................... 60/487

FOREIGN PATENT DOCUMENTS

| EP | 0 310 962 | | 4/1989 |
| EP | 1054176 A2 | * | 11/2000 |
| EP | 1055836 A2 | * | 11/2000 |
| JP | 483920 A | * | 3/1992 |
| JP | 2000310246 A | * | 11/2000 |
| JP | 2000337402 A | * | 12/2000 |

* cited by examiner

*Primary Examiner*—Charles A Marmor
*Assistant Examiner*—Saúl Rodriguez
(74) *Attorney, Agent, or Firm*—Wenderoth, Lind & Ponack, L.L.P.

(57) ABSTRACT

A valve block coupled to a rotor is provided with a drain mechanism that includes a drain pin adapted to open and close a drain hole. The drain pin is incorporated in a drain plug by providing a support by a return spring. The drain pin has an orifice for generating a flow resistance. One end turn portion of the return spring is press fitted into the interior of the drain pin having the orifice, while the other end turn portion of the return spring is press fitted into the interior of a limiter plug having a limiter pin, whereby the drain pin is rotationally positioned to alleviate cavitation noises.

5 Claims, 4 Drawing Sheets

HYDRAULIC POWER TRANSMISSION JOINT

BACKGROUND OF THE INVENTION

1. Field of the Invention

The present invention relates generally to a hydraulic power transmission joint for use in automotive 4 wheel-drive mechanisms for the distribution of driving force, and more particularly to a hydraulic power transmission joint designed to suppress cavitation noises arising from a drain mechanism built in a valve block within the joint.

2. Description of the Related Arts

Such a hydraulic power transmission joint for use in an automotive 4 wheel-drive mechanism is hitherto known from U.S. Pat. Nos. 5,706,658 and 5,983,635.

This hydraulic power transmission joint comprises a housing disposed between input and output shafts that are capable of relative rotations, the housing being coupled to one of the input and output shafts and having a cam face formed on its inner side surface; a rotor coupled to the other of the input and output shaft and being rotatably accommodated in the housing, the rotor having a plurality of axially extending plunger chambers; a plurality of plungers each being reciprocatively accommodated in each of the plurality of plunger chambers under a biasing force of the return spring, the plurality of plungers being operated by the cam face upon the relative rotations of the input and output shafts; a discharge hole formed in the rotor and leading to the plurality of plunger chambers; and a valve block having a high-pressure chamber that leads to the discharge hole, the valve block having an orifice for generating a flow resistance under the action of flow of oil discharged by operations of the plurality of plungers.

FIG. 1 shows by way of example a drain mechanism incorporated in a valve block of a hydraulic power transmission joint being currently developed by the present inventors on the basis of such U. S. Patents, the drain mechanism serving also as a torque limiter mechanism. The drain mechanism is generally designated at 101 and includes a drain plug 102 accommodated in an accommodation hole of the valve block not shown, the drain plug 102 being formed with a drain hole 103. The drain plug 102 accommodates a drain pin 104 such that the latter is able to open and close the drain hole 103, the interior of the drain pin 104 being formed with a high-pressure chamber 106 that communicates via a through-hole 105 with a high-pressure chamber located on its left. An orifice 107 is formed in the drain pin 104. The orifice 107 serves to generate a high pressure by a flow resistance occurring when oil from the plungers passes therethrough, to impart it to the plungers so as to allow a transmission of torque. A seal ring 108 is interposed between the drain plug 102 and the drain pin 104. A return spring 110 intervenes between the inner wall of the high-pressure chamber 106 and a limiter plug 109 provided in abutment against the drain plug 102. The drain pin 104 is urged by the return spring 110 to block the drain hole 103. The limiter plug 109 is formed with a communication hole 111 that leads to the high-pressure chamber 106, with a limiter pin 112 adapted to open and close the communication hole 111 being slidably accommodated in the limiter plug 109. The limiter pin 112 is urged via a thermo-switch (not shown) located on its right side by the return spring, to block the communication hole 111.

When the temperature of the thermo-switch reaches a predetermined temperature, the thermo-switch is actuated to release the pressing action on the limiter pin 112 so that the limiter pin 112 can open the communication hole 111 under the hydraulic pressure within the high-pressure chamber 106. For this reason, the hydraulic pressure within the high-pressure chamber 106 of the drain pin 104 becomes zero all at once, allowing the drain pin 104 to open the drain hole 103 under the hydraulic pressure from the high-pressure chamber (not shown) on its left side. Oil within the high-pressure chamber passes through the drain hole 103 and is drained into the low-pressure chamber, ceasing torque transmission to the rear side. By virtue of this, the joint can be prevented from being subjected to a high temperature upon continuous travels over sandy soil, making it possible to avoid any damage to the joint. On the contrary, in the inoperative status of the thermo-switch prior to reaching a predetermined temperature, the hydraulic pressure within the high-pressure chamber 106 of the drain pin 104 becomes larger than the force biasing the limiter pin 112 rightward once a predetermined hydraulic pressure is reached, allowing the limiter 112 to gradually open the communication hole 111. Thus, the drain pin 104 can gradually open the drain hole 103 while keeping its balance. The transmission torque to the rear side is therefore prevented from increasing accordingly as the rotational-speed difference becomes larger, and it is limited to a certain value. This ensures a smooth start of the motor vehicle.

However, in such a hydraulic power transmission joint, the drain pin having an orifice is accommodated in the drain plug while being urged by the return spring, but the drain pin undergoes no positioning in the direction where the orifice rotates. As a result, the cavitation noises may possibly become louder depending on the rotational position of the orifice.

SUMMARY OF THE INVENTION

According to an aspect of the present invention there is provided a hydraulic power transmission joint capable of suppressing cavitation noises arising from a drain pin having an orifice in a drain mechanism.

An inventive hydraulic power transmission joint is adapted to be interposed between an input shaft and an output shaft that are rotatable relative to each other, and to transmit torque as a function of the rotational-speed difference between the input and output shafts. The hydraulic power transmission joint comprises a housing coupled to the input shaft and having a cam face formed on its inner side surface; a rotor coupled to the output shaft and being rotatably accommodated in the housing, the rotor having a plurality of axially extending plunger chambers; a plurality of plungers each being reciprocatively accommodated in each of the plurality of plunger chambers under a biasing force of the return spring, the plurality of plungers being operated by the cam face upon the relative rotations of the input and output shafts; a discharge hole formed in the rotor and opening to the plurality of plunger chambers; a valve block coupled to the rotor for being rotated jointly; an orifice formed in the valve block for generating a flow resistance under the action of flow of oil discharged by operations of the plurality of plungers; and a drain mechanism provided in the valve block. The drain mechanism serves, when a predetermined temperature is reached, to open a drain hole to allow oil to flow from a high-pressure side into a low-pressure side to thereby cancel a transmission of torque, the drain mechanism serving, until the predetermined temperature is reached, to regulate the opening of the drain hole to limit a transmission torque to a certain value irrespective of increase in the rotational-speed difference. The drain mechanism includes a drain pin slidably accommodated in a drain plug, and a limiter pin received in a limiter plug disposed in abutment against the drain plug for opening and closing a communication hole that leads to the drain pin, with one end turn portion of the return spring being press fitted into the interior of the drain pin, and with the other end turn portion being press fitted into the interior of the limiter plug, to thereby rotationally position the drain pin.

According to the hydraulic power transmission joint of the present invention having the above configuration, one end turn portion of the return spring is press fitted into the interior of the drain pin having an orifice for generating a flow resistance, with the other end turn portion being press fitted into the interior of the limiter plug to thereby rotationally position the drain pin, whereupon it is possible to restrict the direction of the drain pin having an orifice and thus to reduce the cavitation noises. That is, the press fitting of the return spring end turn portions imparts a whirl-stop function to the return spring so that whirl-stop is provided in the rotational direction to alleviate the cavitation noises without any need for additional pins and grooves.

Herein, the interior of the drain pin may be formed with a flared portion that receives the one end turn portion of the return spring, and the limiter plug may include a groove having a flared portion that receives the other end turn portion of the return spring. Preferably, the end turn portions at opposed ends of the return spring have diameters that increase toward the opposed ends.

The drain mechanism may comprise a limiter plug accommodated within the valve block and having a communication hole through which oil is introduced from a first high-pressure chamber; a thermo-switch located within a low-pressure chamber in the valve block in such a manner as to be urged by a return spring, the thermo-switch having a head pin that protrudes when a predetermined temperature is reached; a fixed pin fixedly inserted into the valve block, the fixed pin being positioned so as to allow the head pin of the thermo-switch urged by the return spring to abut thereagainst, the fixed pin when the head pin protrudes at the predetermined temperature causing the thermo-switch to retreat against the return spring; a limiter pin slidably located within the limiter plug, the limiter pin being pressed by the thermo-switch to close the communication hole for the duration in which the predetermined temperature is not reached, the limiter pin when the predetermined temperature is reached, opening the communication hole as a result of cutoff of the pressing force induced by a retreat of the thermo-switch, the limiter pin when a predetermined torque is reached, opening the communication hole by a high pressure from the first high-pressure chamber; a drain plug that follows the limiter plug, accommodated in the valve block, the drain plug having a drain hole through which oil is discharged from a second high-pressure chamber; and a drain pin slidably located within the drain plug in such a manner as to be urged by a return spring, the drain pin having the first high-pressure chamber into which oil is introduced from the second high-pressure chamber and which opens to the communication hole, the drain pin closing the drain hole under a pressing force of the limiter pin until a predetermined temperature is reached, the drain pin rapidly opening the drain hole in response to a retreat of the limiter pin effected when the predetermined temperature is reached, the drain pin when a predetermined torque is reached for the duration in which the predetermined temperature is not yet reached, opening the drain hole while adjusting its balance so as to keep the predetermined torque. Furthermore, the orifice is preferably formed in a communication passage between the first high-pressure chamber located in the interior of the drain pin and the exterior low pressure side.

The above and other objects, aspects, features and advantages of the present invention will become more apparent from the following detailed description when taken in conjunction with the accompanying drawings.

DESCRIPTION OF THE PREFERRED EMBODIMENTS

Figure 2:
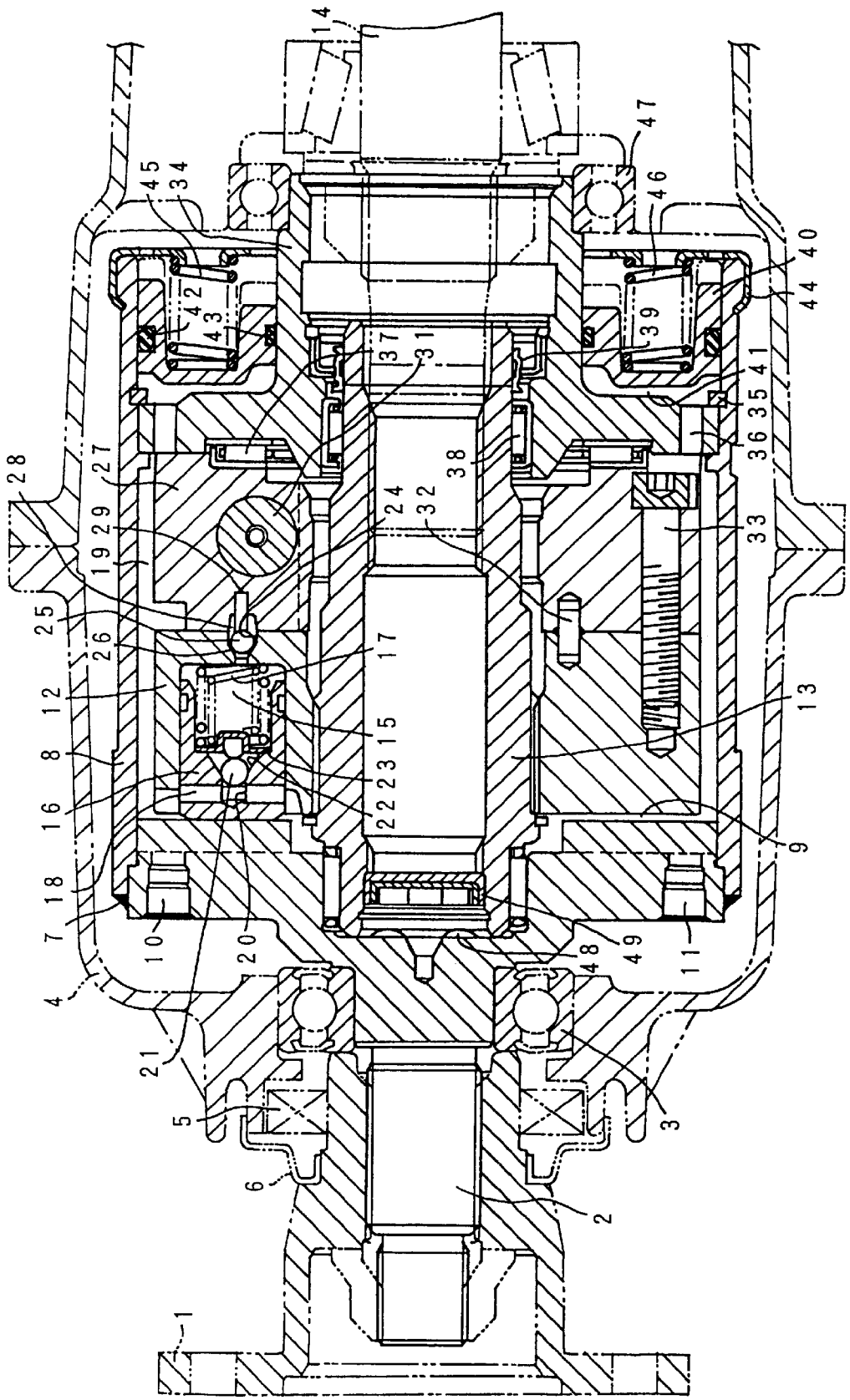
FIG. 2 is a sectional view of an embodiment of the present invention.

FIG. 2 is a sectional view of an embodiment of the present invention. A companion flange 1 is coupled to a propeller shaft not shown acting as a front wheel driving shaft. A cam housing shank 2 is inserted into the companion flange 1 for spline coupling. The cam housing shank 2 has on its outer periphery a front bearing 3 by way of which the cam housing shank 2 is supported on a differential gear case 4. Between the differential gear case 4 and the companion flange 1 there are provided a seal member 5 and a cover 6 that prevent in cooperation entrance of foreign particles and outflow of differential gear oil. A housing 8 is secured at a weld 7 to the right-hand end of the cam housing shank 2. On its inner side surface, the cam housing shank 2 is provided with a cam face 9 having two or more raised portions. Plugs 10 and 11 are inserted into the cam housing shank 2, for allowing oil to be injected into the interior of the joint or discharged therefrom. A rotor 12 is rotatably accommodated in the housing 8 and is engaged with a main shaft 13 for integral rotation therewith. A drive pinion gear 14 of a rear differential gear is fixedly inserted into the interior of the main shaft 13 from the right side so that the main shaft 13 rotates jointly with the drive pinion gear 14. The rotor 12 is formed with a plurality of axially extending plunger chambers 15, each of which houses a plunger 16 slidably by way of a return spring 17. An intake passage 18 is formed in the plunger 16 at its head side that communicates with a low-pressure chamber 19. The intake passage 18 opens to the plunger chamber 15 by way of a communication hole 20 that is opened or closed by a one-way valve unit 21 for intake in the form of a ball. The interior of the plunger chamber 15 is formed with a valve seat 22 on which the one-way valve unit 21 is seated. A check plug 23 is disposed at the stepped portion of the valve seat 22. Between the check plug 23 and the one-way valve unit 21 there is interposed a check spring (not shown) that serves to urge the one-way valve unit 21 for positioning. The return spring 17 intervenes between the check plug 23 and the bottom of the rotor 12. A discharge hole 24 is formed in the rotor 12 so as to open to the plunger chamber 15. A one-way valve unit 25 for discharge is in the form of a ball and is disposed in the discharge hole 24. The discharge hole 24 is formed with a valve seat 26 on which the one-way valve unit 25 is seated.

The rotor 12 is followed by a valve unit 27 which is provided with a high-pressure chamber 28 that communicates with the discharge hole 24 of the rotor 12. A restriction member 29 projects into the high-pressure chamber 28 for positioning the one-way valve unit 25 at a predetermined location. The valve unit 27 is provided with a relief member 31 having an orifice. The valve unit 27 and the rotor 12 are positioned relative to each other by a pin 32 and are rigidly fastened together by a bolt 33. When the plunger 16 is in its intake stroke, the one-way valve 21 for intake at the head of the plunger 16 is opened allowing oil to flow through the low-pressure chamber 19, intake passage 18 and the communication hole 20 into the plunger chamber 15. At that time, the one-way valve 25 for discharge at the discharge hole 24 of the rotor 12 is closed to prevent a back flow of oil from the high-pressure chamber 28. On the contrary, when the plunger 16 is in its discharge stroke, the one-way valve unit 25 at the discharge side is opened allowing oil within the plunger chamber 15 to flow through the discharge hole 24 and high-pressure chamber 28 into the orifice. At that time, the one-way valve 21 for intake is closed to prevent oil from leaking through the communication hole 20 and intake passage 18 into the low-pressure chamber 19.

The valve unit 27 is followed by a bearing retainer 34. The bearing retainer 34 is rigidly press fitted into the housing 8 and is positioned by a snap ring 35. The bearing retainer 34 is formed with a through-hole 36 that communicates with the low-pressure chamber 19. Needle bearings 37 and 38 are interposed between the bearing retainer 34 and the valve unit 27 and between the bearing retainer 34 and the main shaft 13, respectively. A seal ring 39 is also provided between the bearing retainer 34 and the main shaft 13 for the prevention of an outflow of oil. Outside the bearing retainer 34 there is slidably provided an accumulator piston 40 for absorbing oil thermal expansion and contraction, the accumulator piston 40 defining an accumulator chamber 41 that communicates with the low-pressure chamber 19 by way of the through-hole 36 in the bearing retainer 34. O-rings 42 and 43 are interposed between the accumulator piston 40 and the housing 8 and between the accumulator piston 40 and the bearing retainer 34, respectively. Return springs 45 and 46 are disposed between an accumulator retainer 44 and the bottom of the accumulator piston 40. The extended portion of the bearing retainer 34 has on its outer periphery a rear bearing 47 by way of which the bearing retainer 34 is supported by the differential gear case 4. A lubricant groove 48 and a seal member 49 are provided in the left-hand opening of the main shaft 13.

Figure 1:
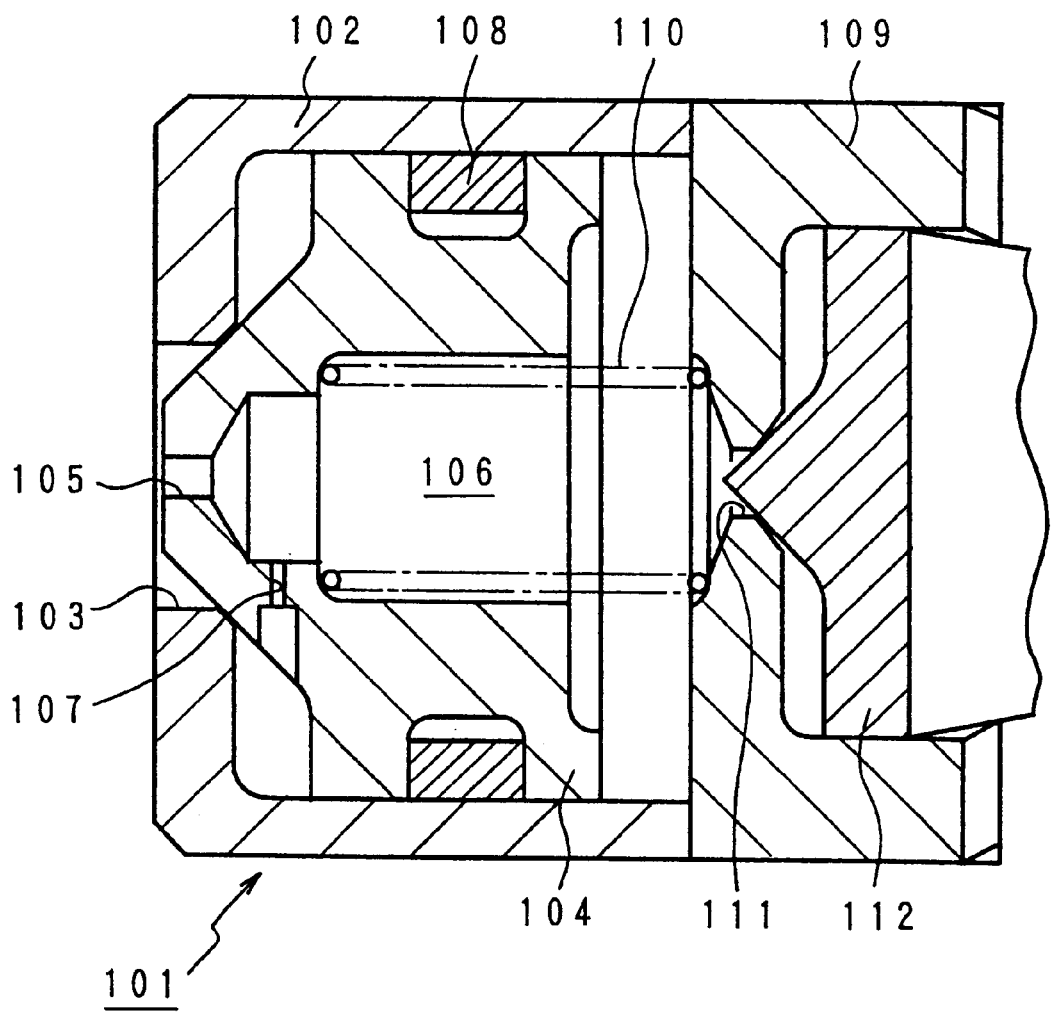
FIG. 1 is a sectional view of a drain mechanism being currently developed by the present inventors.
Figure 3:
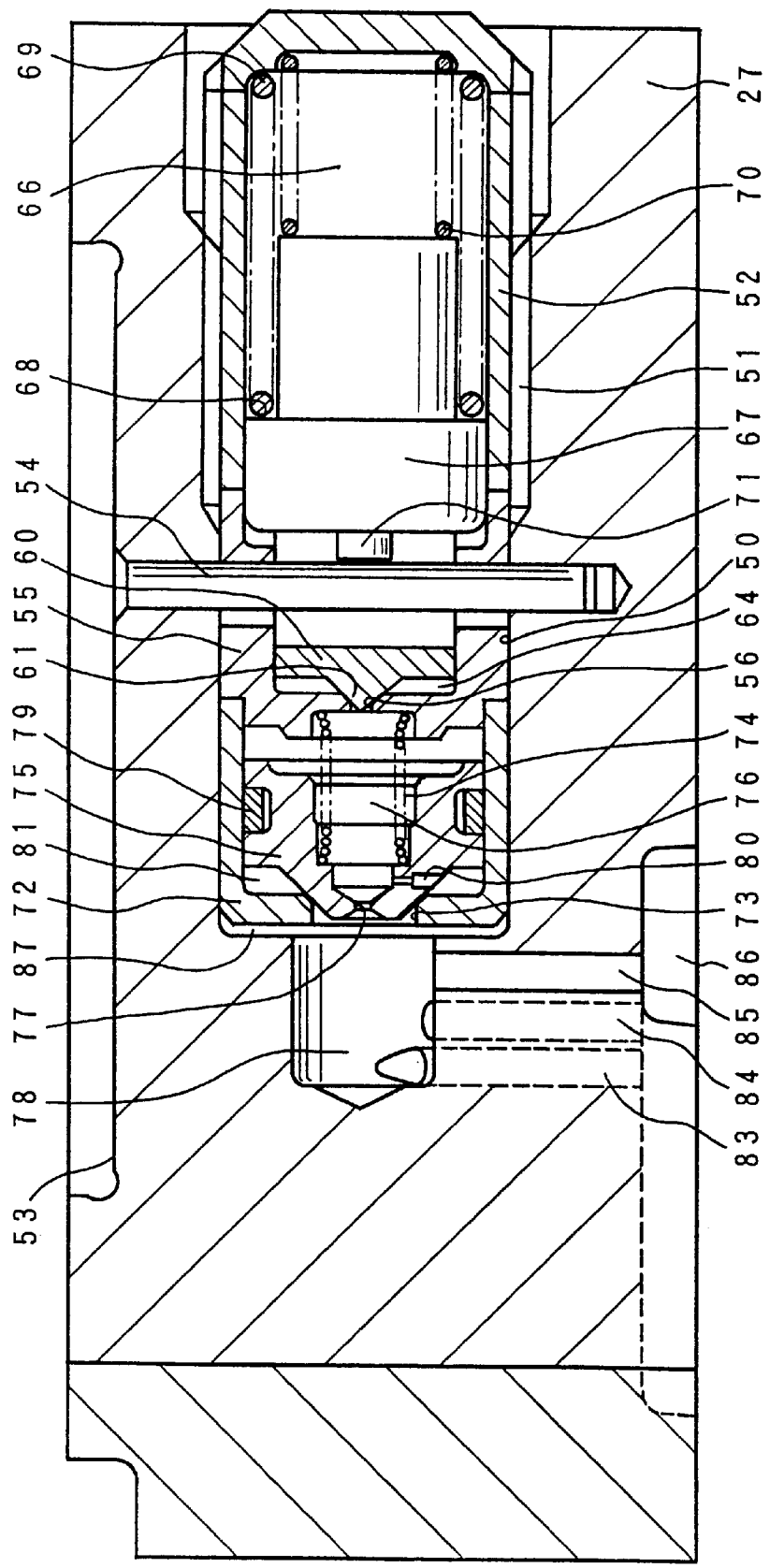
FIG. 3 is a sectional view of a valve block portion of FIG. 2.

FIG. 3 is a fragmentary sectional view of the valve unit 27 of FIG. 1. The valve unit 27 is coupled to the rotor 12 and rotates jointly with the rotor 12. The valve unit 27 includes an accommodation hole 50 that is formed with a threaded portion 51 for receiving a switch plug 52. At its upper end (right-hand end) the valve unit 27 is formed with a bearing seat 53 for the needle bearing 37. A fixed pin 54 is inserted from the bearing seat 53 through the accommodation hole 50 and is retained rigidly by the needle bearing 37 for the prevention of dislocation. A metallic limiter plug 55 is inserted into the accommodation hole 50 and is of a substantially cup-shaped profile. The limiter plug 55 is formed with a communication hole 56 that communicates with the high-pressure side. The communication hole 56 is of a small diameter and serves to keep the high-pressure-side hydraulic pressure at a high pressure. A limiter pin 60 is received in the limiter plug 55 and has a protrusion 61 for opening and closing the communication hole 56. The limiter pin 60 is open at the end opposite the protrusion 61 and is provided with a recessed portion. The fixed pin 54 is inserted through the recessed portion of the limiter pin 60 in such a manner that when the limiter pin 60 is displaced to open the communication hole 56, the recessed portion is brought into abutment against the fixed pin 54 so that the displacement of the limiter pin 60 is restricted. A discharge hole (not shown) is formed in the drain chamber 64 of the limiter plug 55 that accommodates the limiter pin 60, the discharge hole communicating with a drain passage (not shown) formed in the valve unit 27. After leaving the communication hole 56, oil flows through the drain chamber 64 and discharge hole into the drain passage, after which it is drained into the low-pressure chamber. The limiter plug 55 is followed by a switch plug 52 having a threaded portion 51. Within the switch plug 52 there is formed a low-pressure chamber 66 which displaceably accommodates a thermo-switch 67 that has a shoulder 68 formed on its outer periphery. A return spring 70 is interposed between the shoulder 68 and the switch plug 52, and a return spring 69 is interposed between the bottom of the thermo-switch 67 and the switch plug 52. The thermo-switch 67 is urged by the return springs 69 and 70 so as to press the limiter pin 60 leftward in the diagram to thereby close the communication hole 56. The thermo-switch 67 has integrally therewith a head pin 71 located centrally at its fore-end in such a manner that prior to the operation within a predetermined temperature, a minute gap is formed between the head pin 71 and the fixed pin 54. Arrangement is such that when a predetermined temperature is reached, the head pin 71 is extended to abut against the fixed pin 54, with the resultant reaction force causing the thermo-switch 67 to be displaced rightward against the return springs 69 and 70, whereupon a high-pressure from the high-pressure side causes a rightward displacement of the limiter pin 60 to open the communication hole 56. Furthermore, when a predetermined torque is exceeded within the predetermined temperature, the limiter pin 60 is displaced rightward against the return springs 69 and 70, by a high pressure acting on the limiter pin 60 through the communication hole 56, to gradually open the communication hole 56. A drain plug 72 is received at the bottom of the accommodation hole 50 formed in the valve unit 27. The drain plug 72 has a drain hole 73. The drain plug 72 slidably accommodates a drain pin 75 urged by a return spring 74. The interior of the drain pin 75 is formed with a first high-pressure chamber 76 that leads via the communication hole 56 to the drain chamber 64 in the limiter plug 55 and that leads via a through-hole 77 formed at the fore-end to a second high-pressure chamber 78 formed in the valve unit 27. A seal ring 79 is interposed between the drain pin 75 and the drain plug 72. The drain pin 75 has an orifice 80 that allows a communication between its exterior and interior. The orifice 80 allows an external drain chamber 81 formed between the drain plug 72 and the drain pin 75 to communicate with the interior first high-pressure chamber 76. The orifice 80 allows torque to occur due to the flow resistance when oil passes through the orifice 80. The drain chamber 81 opens to a drain passage (not shown) so that after entering the drain chamber 81, oil is drained through the drain passage into the low-pressure chamber.

When a predetermined temperature is reached, the head pin 71 is extended so that the thermo-switch 67 retreats as a result of abutment against the fixed pin 54, thus releasing the pressing of the limiter pin 60 to allow the limiter pin 60 to open the communication hole 56. In consequence, the hydraulic pressure within the first high-pressure chamber 76 of the drain pin 75 becomes in zero all at once, whereupon by the hydraulic pressure within the second high-pressure chamber 78 that overcomes the spring force of the return spring 74, the drain pin 75 open the drain hole 73 for the drainage of oil. On the contrary, when a predetermined torque is reached in the inoperative state of the thermo-switch, the force applied to the limiter pin 60 by the hydraulic pressure of the first high-pressure chamber 76 overcomes the spring forces of the return springs 69 and 70, so that the limiter pin 60 opens the communication hole 56 for pressure regulation. In consequence, a balance may vary between the hydraulic pressure within the second high-pressure chamber 78 and the combined force of the hydraulic pressure within the first high-pressure chamber 76 and the spring force of the return spring 74, with the result that the drain pin 75 itself is gradually balanced by the hydraulic pressure, to open the drain hole 73 to thereby drain the oil within the second high-pressure chamber 78 for pressure regulation. The second high-pressure chamber 78 leads to a high-pressure port 86 by way of three high-pressure passages 83, 84 and 85. From the high-pressure port 86 the oil flows through the high-pressure passages 83, 84 and 85 into the second high-pressure chamber 78. The return springs 69 and 70 press the limiter pin 60 by way of the thermo-switch 67, with the spring forces of the return springs 69 and 70 being greater than the hydraulic pressure within the first high-pressure chamber 76, to allow the limiter pin 60 to close the communication hole 56. The drain pin 75 is urged leftward by the return spring 74 and by the hydraulic reaction force of the first high-pressure chamber 76, to close the drain hole 73. The hydraulic pressure is thus sealed. On the contrary, after entering the first high-pressure chamber 76, the hydraulic pressure is applied through the orifice 80 and, from the drain chamber 81 via the drain passage into the low-pressure chamber. The torque characteristic normally results in a torque that is proportional to the square of the rotational-speed difference. When a predetermined temperature is reached, the head pin 71 of the thermo-switch 67 is extended leftward to abut against the fixed pin 54, with the resultant reaction force causing the thermo-switch 67 to retreat rightward against the return springs 69 and 70. This cuts off the force pressing the limiter pin 60 to compulsorily relieve the limiter pin 60. When the communication hole 56 is opened by the limiter pin 60, the hydraulic pressure within the drain chamber 64 is drained through the drain passage into the low-pressure chamber, nullifying the hydraulic pressure within the first high-pressure chamber 76 in the drain pin 75 all at once. For this reason, the drain pin 75 opens the drain hole 73 for the drainage of oil by the hydraulic pressure within the second high-pressure chamber 78 that exceeds the spring force of the return spring 74. The torque becomes substantial zero. Then, when a predetermined hydraulic pressure is reached in the inoperative state of the thermo-switch, the balance between the hydraulic pressure within the first high-pressure chamber 76 and the biasing forces of the return springs 69 and 70 is overcome, with the result that the hydraulic pressure within the first high-pressure chamber 76 acting on the limiter pin 60 overcomes the spring forces of the return springs 69 and 70, allowing the limiter pin 60 to open the communication hole 56, for pressure regulation. The balance thereby varies between the hydraulic pressure within the second high-pressure chamber 78 and the combined force of the hydraulic pressure within the first high-pressure chamber 76 and the spring force of the return spring 74. In this case, the hydraulic pressure within the second high-pressure chamber 78 overcomes the combined force of the hydraulic pressure and the spring force of the return spring 74, allowing the drain pin 75 to gradually open the drain hole 73. In this manner, the drain pin 75 itself gradually catches a hydraulic balance while draining the oil. The torque characteristic at that time can keep a constant value in case a predetermined torque is exceeded. In this way, the drain pin 75 itself can operate by hydraulic balance and keep a certain torque, thus making it possible to act as both the temperature dependent 2 wheel-drive mechanism and the torque limiter mechanism.

Figure 4:
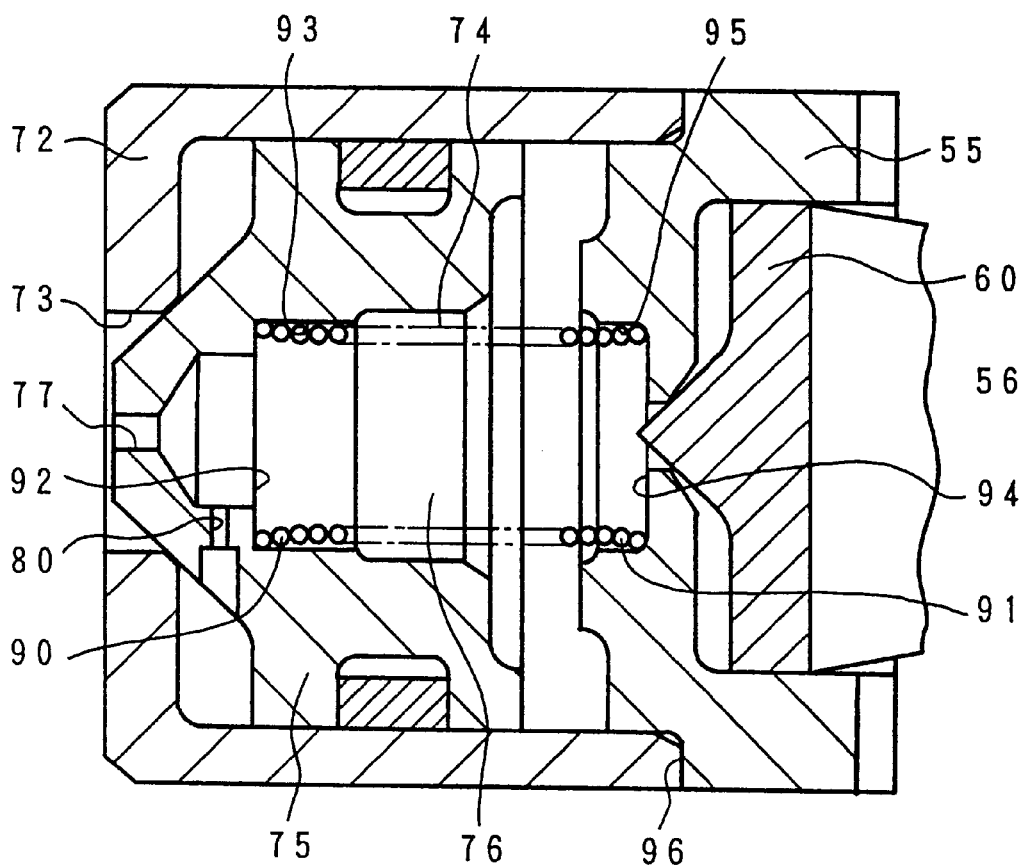
FIG. 4 is an enlarged fragmentary section of a drain plug portion of FIG. 3.

FIG. 4 depicts the region of the drain plug 72 and drain pin 75 of FIG. 3 on an enlarged scale. The return spring 74 is compressively disposed within the first high-pressure chamber 76 of the drain pin 75 so that the drain pin 75 can block the drain hole 73. At its opposed ends, the return spring 74 has end turn portions 90 and 91 whose diameters are gradually increased toward the extremities. The interior of the first high-pressure chamber 76 is formed with a shoulder 92 continuous with the inner wall having a flared portion 93 that flares toward the through-hole 77. Outside the communication hole 56, the limiter plug 55 is provided with a groove 94 having a flared portion 95 that flares toward the communication hole 56. The outer periphery of the limiter plug 55 is formed with a notch 96 adapted to receive the drain plug 72. Thus, the limiter plug 55 and the drain plug 72 are fixedly joined together within the interior of the valve unit 27. The end turn portion 90 on one end of the return spring 74 is press fitted on the shoulder 92 of the drain pin 75 along the flared portion 93 while the end turn portion 91 on the other end of the return spring 74 is press fitted into the groove 94 of the limiter plug 55 along the tapered portion 95. This allows the drain pin 75 having the orifice 80 to be rotationally positioned. Such restriction to the direction of the drain pin 75 having the orifice 80 enables cavitation noises to be alleviated. More specifically, press fitting of the end turn portions 90 and 91 of the return spring 74 can impart a whirl-stop function to the return spring 74, whereby it is possible to provide a whirl stop to reduce the cavitation noises without any need for additional pins and grooves.

It will be appreciated that the present invention is not limited to the above embodiment and that it includes any appropriate variants insofar as they do not impair the objects and advantages thereof. The present invention is not intended to be restricted by the numerical values shown in the above embodiment.

What is claimed is:

1. A hydraulic power transmission joint adapted to be interposed between an input shaft and an output shaft that are rotatable relative to each other, to transmit torque as a function of the rotational-speed difference between said input and output shafts, said hydraulic power transmission joint comprising:

a housing to be coupled to said input shaft and having a cam face formed on its inner side surface;

a rotor to be coupled to said output shaft and being rotatably accommodated in said housing, said rotor having a plurality of axially extending plunger chambers;

a plurality of plungers each being reciprocatively accommodated in each of said plurality of plunger chambers under a biasing force of a return spring, said plurality of plungers being operated by said cam face upon the relative rotations of said housing and said rotor;

a discharge hole formed in said rotor and opening to said plurality of plunger chambers;

a valve block coupled to said rotor for being rotated jointly;

an orifice formed in said valve block for generating a flow resistance under the action of flow of oil discharged by operations of said plurality of plungers; and a drain mechanism provided in said valve block, said drain mechanism serving, when a predetermined temperature is reached, to open a drain hole to allow oil to flow from a high-pressure side into a low-pressure side to thereby cancel a transmission of torque, said drain mechanism serving, until said predetermined temperature is reached, to regulate the opening of said drain hole to limit a transmission torque to a certain value irrespective of increase in the rotational-speed difference; wherein said drain mechanism includes a drain pin slidably accommodated in a drain plug, and a limiter pin received in a limiter plug disposed in abutment against said drain plug for opening and closing a communication hole that leads to said drain pin, with one end turn portion of said return spring being press fitted into the interior of said drain pin, and with the other end turn portion being press fitted into the interior of said limiter plug, to thereby rotationally position said drain pin.

2. A hydraulic power transmission joint according to claim 1, wherein the interior of said drain pin is formed with a flared portion that receives said one end turn portion of said return spring, and wherein said limiter plug includes a groove having a flared portion that receives said other end turn portion of said return spring.

3. A hydraulic power transmission joint according to claim 1, wherein said end turn portions at opposed ends of said return spring have diameters that increase toward said opposed ends.

4. A hydraulic power transmission joint according to claim 1, wherein said drain mechanism comprises: ;

a limiter plug accommodated within said valve block and having a communication hole through which oil is introduced from a first high-pressure chamber;

a thermo-switch located within a low-pressure chamber, in said valve block in such a manner as to be urged by a switch return spring, said thermo-switch having a head pin that protrudes when a predetermined temperature is reached;

a fixed pin fixedly inserted into said valve block, said fixed pin being positioned so as to allow said head pin of said thermo-switch urged by said switch return spring to abut thereagainst, said fixed pin when said head pin protrudes at said predetermined temperature causing said thermo-switch to retreat against said switch return spring;

a limiter pin slidably located within said limiter plug, said limiter pin being pressed by said thermo-switch to close said communication hole for the duration in which said predetermined temperature is not reached, said limiter pin when said predetermined temperature is reached, opening said communication hole as a result of cutoff of the pressing force induced by a retreat of said thermo-switch, said limiter pin when a predetermined torque is reached, opening said communication hole by a high pressure from said first high-pressure chamber;

a drain plug that follows said limiter plug, accommodated in said valve block, said drain plug having a drain hole through which oil is discharged from a second high-pressure chamber; and a drain pin slidably located within said drain plug in such a manner as to be urged by a return spring, said drain pin having said first high-pressure chamber into which oil is introduced from said second high-pressure chamber and which opens to said communication hole, said drain pin closing said drain hole under a pressing force of said limiter pin until a predetermined temperature is reached, said drain pin rapidly opening said drain hole in response to a retreat of said limiter pin effected when said predetermined temperature is reached, said drain pin when a predetermined torque is reached for the duration in which said predetermined temperature is not yet reached, opening said drain hole while adjusting its balance so as to keep said predetermined torque.

5. A hydraulic power transmission joint according to claim 4, wherein said orifice is formed in a communication passage between said first high-pressure chamber located in the interior of said drain pin and the exterior low pressure side.

* * * * *